United States Patent
Gillum et al.

(10) Patent No.: US 8,370,908 B2
(45) Date of Patent: Feb. 5, 2013

(54) DECREASING LOGIN LATENCY

(75) Inventors: Eliot C. Gillum, Mountain View, CA (US); Aladdin A. Nassar, Santa Clara, CA (US); John P. Walpole, Hong Kong (HK); Hans Matthew Endresen, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 692 days.

(21) Appl. No.: 12/482,421

(22) Filed: Jun. 10, 2009

(65) Prior Publication Data

US 2010/0319056 A1 Dec. 16, 2010

(51) Int. Cl.
*H06F 15/16* (2006.01)
(52) U.S. Cl. .................. 726/5; 726/3; 726/26; 713/150; 713/168; 713/175; 709/223; 709/224; 709/225
(58) Field of Classification Search .................. 726/2, 3, 726/5; 713/150, 168, 175
See application file for complete search history.

(56) References Cited

U.S. PATENT DOCUMENTS

| | | | | |
|---|---|---|---|---|
| 6,182,142 | B1 * | 1/2001 | Win et al. | 709/229 |
| 6,401,125 | B1 | 6/2002 | Makarios | |
| 6,763,468 | B2 | 7/2004 | Gupta et al. | |
| 7,016,960 | B2 | 3/2006 | Howard | |
| 7,237,118 | B2 | 6/2007 | Himberger | |
| 2004/0049673 | A1 * | 3/2004 | Song et al. | 713/150 |
| 2007/0245137 | A1 | 10/2007 | Bhagat | |
| 2008/0195696 | A1 | 8/2008 | Boutroux | |
| 2009/0024737 | A1 * | 1/2009 | Goldspink et al. | 709/224 |

OTHER PUBLICATIONS

"Active Cookie for Browser Authentication"—Ari Juels, Markus Jakobsson, and Sid Stamm, IU, Apr. 2006 www.cs.princeton.edu/—jhalderm/papers/www2005.pdf.*
"Dos and Don'ts of Client Authentication on the Web"—Kevin Fu, Emil Sit, Kendra Smith, and Nick Feamster, MIT, Jul. 2001 http://cookies.lcs.mit.edu/pubs/webauth:tr.pdf.*
Identifying and Caching Dynamic Web Applications: a Flexible Approach to Solving Performance Issues http://www.f5.com/pdf/white-papers/dynamic-caching-wp.pdf, Sep. 2006.
How Pubcookie Works http://www.pubcookie.org/docs/how-pubcookie-works.html, Feb. 2003.
Asp.Net Cookies Overview http://msdn.microsoft.com/en-us/library/ms178194.aspx, Sep. 2008.
CUWebLogin 2.0 Overview https://identity.cit.cornell.edu/authn/K5Project/documents/CUWL2-06.doc, Jan. 1, 2007.
Securely Encrypt Data Stored in Cookies http://www.rolosoft.com/software/cookie-secure/net/features/encrypted-data.aspx, Jan. 2009.

* cited by examiner

*Primary Examiner* — Krista Zele
*Assistant Examiner* — Randy Scott
(74) *Attorney, Agent, or Firm* — Shook, Hardy & Bacon L.L.P.

(57) ABSTRACT

Systems, methods, and computer-storage media for decreasing web service login latency are provided. Upon a user's initial login to the web service from a web browser, the location of user information is identified. A cookie containing information identifying the location of the user information is generated and stored in association with the web browser. Upon a subsequent login to the web service by the same user, the location information included in the cookie is utilized to direct the user request directly to the correct location, without having to repeat the act of identifying the location, thus providing the user with the desired information more quickly.

17 Claims, 9 Drawing Sheets

DECREASING LOGIN LATENCY

BACKGROUND

The large numbers of subscribers to Internet services requiring a web login has led to the need for a partitioning of hardware resources. Moreover, given the constant change and evolution in the development of web systems, processes such as the login of a subscriber to a web service, have begun to become compartmentalized across these partitioned hardware resources. This division of processing functions across partitioned hardware resources produces a delay for users upon logging into a login-required web service.

SUMMARY

Embodiments of the present invention relate to systems, methods, and computer-storage media for decreasing login latency by generating a cookie associated with a web browser, the cookie including the location of user information, that is, the identifying storage area (e.g., partition) associated with a server or set of servers where information associated with the user is stored. Upon the user's initial login to a web service from a web browser, the identifying storage area or partition associated with the user's information is identified. A cookie containing location information identifying the partition is generated and stored in association with the web browser. Upon a subsequent login to the web service by the same user, the partition location information included in the cookie is utilized to direct the user directly to the correct partition, without having to repeat the act of identifying the partition, thus providing the user with the desired information more quickly.

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

BRIEF DESCRIPTION OF THE DRAWINGS

Illustrative embodiments of the present invention are described in detail below with reference to the attached drawing figures, which are incorporated by reference herein, and wherein.

DETAILED DESCRIPTION

Figure 1:
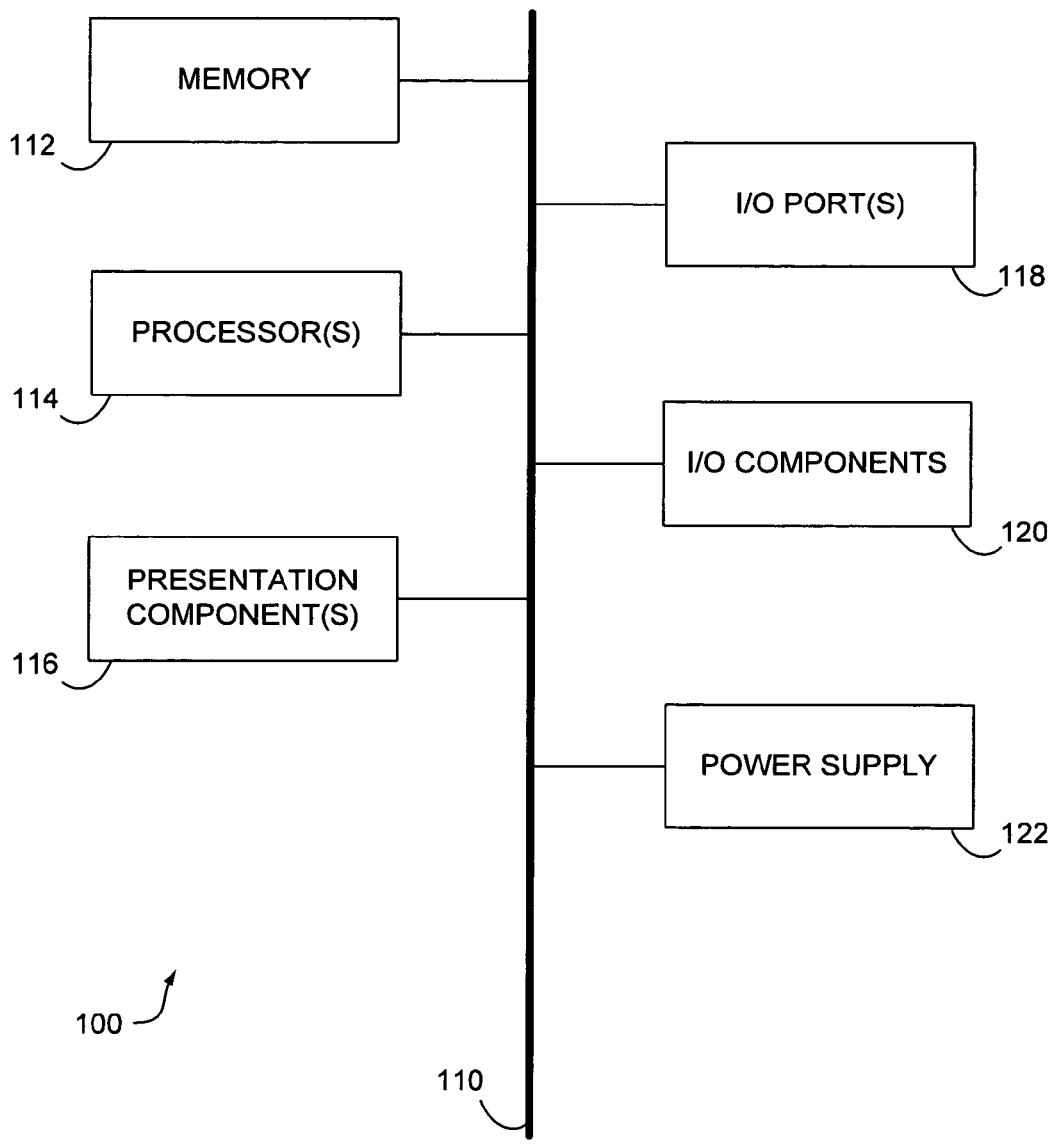
FIG. 1 is an exemplary computing device suitable for implementing embodiments of the present invention.

The subject matter of embodiments of the present invention is described with specificity herein to meet statutory requirements. However, the description itself is not intended to limit the scope of this patent. Rather, the inventors have contemplated that the claimed subject matter might also be embodied in other ways, to include different steps or combinations of steps similar to the ones described in this document, in conjunction with other present or future technologies. Although the terms "step" and/or "block" or "module" etc. might be used herein to connote different components of methods or systems employed, the terms should not be interpreted as implying any particular order among or between various steps herein disclosed unless and except when the order of individual steps is explicitly described.

Embodiments of the present invention relate to systems, methods, and computer-storage media for decreasing web service login latency. Upon a user's initial login to the web service from a web browser, the location of user information, that is, the identifying storage area (e.g., partition) associated with a server or set of servers where information associated with the user is stored, is identified. It will be understood use of the term "user" herein is not meant to be limited to a person and/or individual, but rather may be considered a partitioned entity that may represent a part of an account, a group account, a company account, or another non-person-based entity accessing an account.

A cookie containing location information identifying the partition is generated and stored in association with the web browser. Upon a subsequent login to the web service by the same user, the partition location information included in the cookie is utilized to direct the user request directly to the correct partition, without having to repeat the act of identifying the partition, thus providing the user with the desired information more quickly. In embodiments, the cookie may comprise identity information associated with one or more users. In further embodiments, identity information for a plurality of users included in a single cookie may be disambiguated. The information may be disambiguated within the cookie, or through the interpretation of the information on the cookie.

Accordingly, in one embodiment, the present invention provides one or more computer-storage media having computer-useable instructions embodied thereon that, when executed, perform a method for decreasing login latency. The method includes, at a first server, receiving from a browser running on a computing device a first request for information associated with a first user; authenticating the first user; directing the first request for the information associated with the first user to a second server; determining at the second server in association with which first particular partition of a plurality of partitions associated with a third server the requested information associated with the first user is stored; directing the first request for the information associated with the first user to the first particular partition; and storing a first cookie in association with the browser, the first cookie including location information for the first particular partition.

In another embodiment, the present invention provides one or more computer-storage media having computer-useable instructions embodied thereon that, when executed, perform a method for decreasing login latency. The method includes receiving from a browser running on a computing device a request for information associated with a user, the request including a cookie comprising location information for a particular partition of a plurality of partitions that was associated with the requested information upon receipt of the most recent prior request for the information from the browser; authenticating the user; and directing the request for the information to the particular partition based on the location information included in the cookie.

A third embodiment of the present invention provides a computerized method for decreasing login latency. The method includes, at a first server set, receiving from a browser running on a computing device a first request for information associated with a user; authenticating the user; directing the first request for information associated with the user to a second server set; determining at the second server set in association with which particular partition of a plurality of partitions in a third server set the requested information associated with the user is stored; directing the first request for information associated with the user from the second server set to the particular partition; providing the requested information from the particular partition to the browser; generating a cookie, the cookie including location information for the particular partition; storing the cookie in association with the browser; receiving from the browser a second request for the information associated with the user, the second request for the information being received later in time than the first request for the information and including the cookie; authenticating the user; and directing the second request directly to the particular partition based upon the location information included in the cookie.

Having briefly described an overview of embodiments of the present invention, an exemplary operating environment suitable for implementing embodiments hereof is described below.

Referring to the drawings in general, and initially to FIG. 1 in particular, an exemplary operating environment suitable for implementing embodiments of the present invention is shown and designated generally as computing device 100. The computing device 100 is but one example of a suitable computing environment and is not intended to suggest any limitation as to the scope of use or functionality of the invention. Neither should the computing device 100 be interpreted as having any dependency or requirement relating to any one or combination of modules/components illustrated.

Embodiments may be described in the general context of computer code or machine-useable instructions, including computer-executable instructions such as program modules, being executed by a computer or other machine, such as a personal data assistant or other handheld device. Generally, program modules including routines, programs, objects, modules, data structures, and the like, refer to code that performs particular tasks or implements particular abstract data types. Embodiments may be practiced in a variety of system configurations, including handheld devices, consumer electronics, general-purpose computers, specialty computing devices, and the like. Embodiments may also be practiced in distributed computing environments where tasks are performed by remote-processing devices that are linked through a communications network.

With continued reference to FIG. 1, the computing device 100 includes a bus 110 that directly or indirectly couples the following devices: a memory 112, one or more processors 114, one or more presentation components 116, input/output (I/O) ports 118, 1/0 components 120, and an illustrative power supply 122. The bus 110 represents what may be one or more busses (such as an address bus, data bus, or combination thereof). Although the various blocks of FIG. 1 are shown with lines for the sake of clarity, in reality, delineating various components is not so clear, and metaphorically, the lines would more accurately be grey and fuzzy. For example, one may consider a presentation component such as a display device to be an I/O component. Also, processors have memory. The inventors hereof recognize that such is the nature of the art, and reiterate that the diagram of FIG. 1 is merely illustrative of an exemplary computing device that can be used in connection with one or more embodiments. Distinction is not made between such categories as "workstation," "server," "laptop," "handheld device," etc., as all are contemplated within the scope of FIG. 1 and reference to "computer" or "computing device."

The computing device 100 typically includes a variety of computer-readable media. By way of example, and not limitation, computer-readable media may comprise Random Access Memory (RAM); Read Only Memory (ROM); Electronically Erasable Programmable Read Only Memory (EEPROM); flash memory or other memory technologies; CDROM, digital versatile disks (DVD) or other optical or holographic media; magnetic cassettes, magnetic tape, magnetic disk storage or other magnetic storage devices, carrier waves or any other medium that can be used to encode desired information and be accessed by the computing device 100.

The memory 112 includes computer-storage media in the form of volatile and/or nonvolatile memory. The memory may be removable, non-removable, or a combination thereof. Exemplary hardware devices include solid-state memory, hard drives, optical-disc drives, etc. The computing device 100 includes one or more processors 114 that read data from various entities such as the memory 112 or the I/O components 120. The presentation component(s) 116 present data indications to a user or other device. Exemplary presentation components include a display device, speaker, printing module, vibrating component, and the like. The I/O ports 118 allow the computing device 100 to be logically coupled to other devices including the I/O components 120, some of which may be built in. Illustrative I/O components include a microphone, joystick, game pad, satellite dish, scanner, printer, wireless device, and the like.

Figure 2:
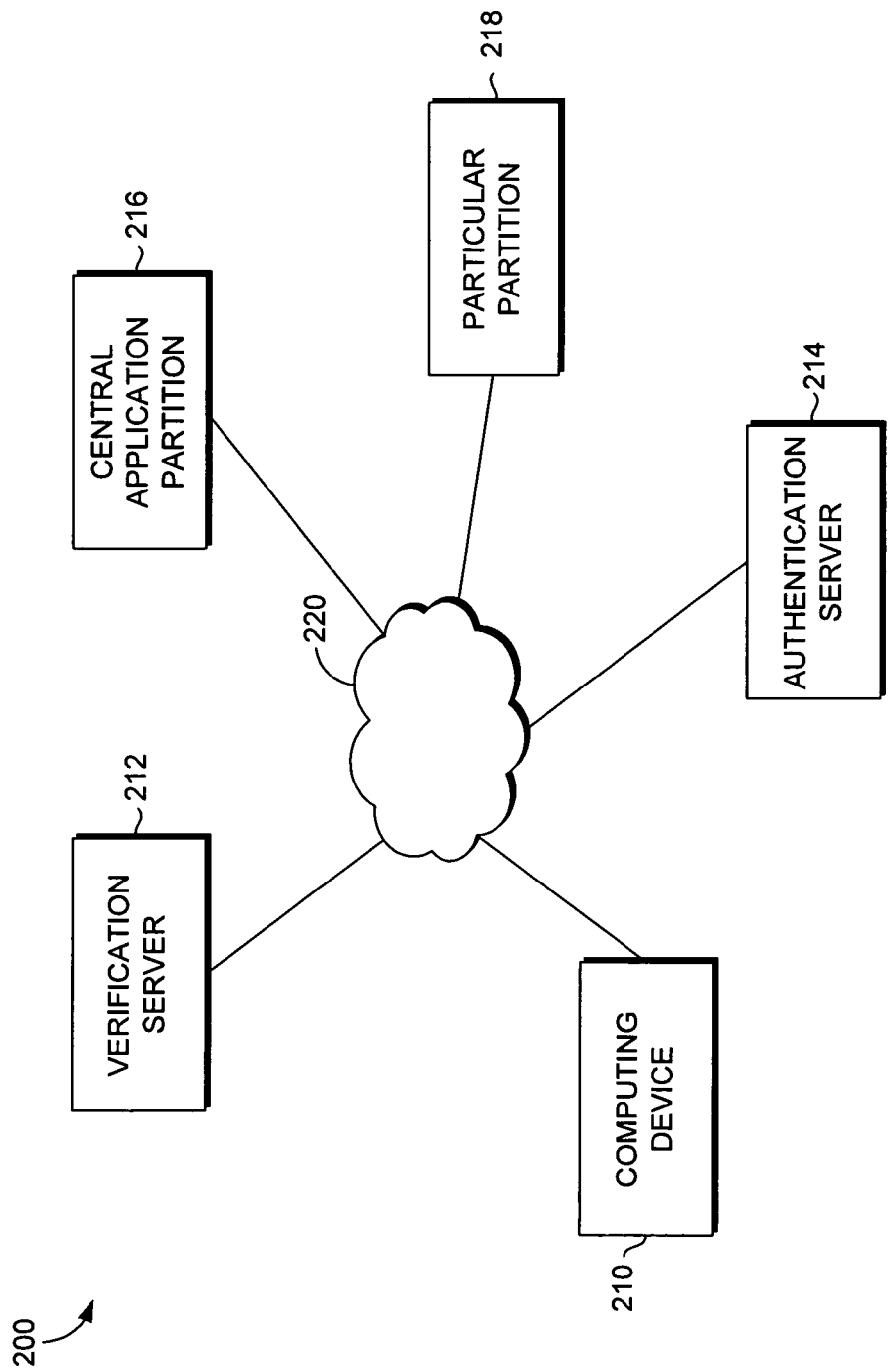
FIG. 2 is a schematic diagram showing an exemplary computing system architecture suitable for decreasing login latency, in accordance with an embodiment of the present invention.

Turning now to FIG. 2, a schematic diagram is illustrated, in accordance with an embodiment of the present invention, showing an exemplary computing system architecture 200 configured to be suitable for decreasing login latency, in accordance with an embodiment of the present invention. It will be understood and appreciated by those of ordinary skill in the art that the computing system architecture 200 shown in FIG. 2 is merely an example of one suitable computing system and is not intended to suggest any limitation as to the scope of the use or functionality of embodiments of the present invention. Neither should the computing system architecture 200 be interpreted as having any dependency or requirement related to any single component or combination of components illustrated therein. Further, the computing system architecture 200 may be provided as a stand-alone product, as part of a software development environment, or any combination thereof within the scope of embodiments of the present invention.

The computing system architecture 200 includes a computing device 210, a verification server 212, an authentication server 214, a central application server 216, and a particular partition 218, all in communication with one another via a network 220. Each of the verification server 212, the authentication server 214 and the central application server 216 may be a single server or a set of a plurality of servers within the scope of embodiments hereof. The network 220 may include, without limitation, one or more local area networks (LANs) and/or wide area networks (WANs). Such networking environments are commonplace in offices, enterprise-wide computer networks, intranets and the Internet. Accordingly, the network 222 is not further described herein.

The computing device 210 shown in FIG. 2 may be any type of computing device, such as, for example, the computing device 100 described above with reference to FIG. 1. By way of example only and not limitation, the computing device 210 may be a personal computer, desktop computer, laptop computer, handheld device, mobile handset, consumer electronic device, and the like. Additionally, the computing device 210 may further include a keyboard, keypad, stylus, joystick, and any other input-initiating component that allows a user to provide wired or wireless data over the network 222, e.g., URL requests, login credentials, and the like. It should be noted, however, that the present invention is not limited to implementation on such computing devices, but may be implemented on any of a variety of different types of computing devices within the scope of embodiments hereof.

Embodiments of the present invention relate to systems, methods and computer-storage media having computer-useable instructions embodied thereon that, when executed, perform a method for decreasing login latency by generating a cookie associated with a web browser, the cookie including the location of user information. Upon the user's initial login to a web service from the web browser, the cookie is generated and stored in association with the web browser. Upon a subsequent login to the web service by the same user, the location information included in the cookie is utilized to direct the user request directly to the location of the user's information, without having to repeat the act of identifying the location. This provides the user with the desired information more quickly. The web service to which a user logs in may include, by way of example only, a shopping web service, an e-mail web service, a social-networking web service, and the like.

The login process begins when a user inputs a request to view desired information associated with the user, for instance, by inputting the Uniform Resource Locator (URL) for a login-required website, such as the URL for an email service or shopping service, into a browser running on a computing device, such as computing device 210. In the example of an email service, the desired information associated with the user may include, by way of example only, the user's email account information, stored e-mails, stored contacts, and the like. In the example of a shopping service, the desired information associated with the user may include, by way of example only, the user's shopping basket, transaction history, order status, and the like.

Upon receipt, the request is directed (via the network 220) to the verification server 212. The verification server 212 is configured to determine whether the user is authenticated. If it is determined at the verification server 212 that the user is authenticated, the request is directed to the central application server 216 (via the network 220) where the location of the information associated with the user is determined, as more fully described below. If, however, it is determined at the verification server 212 that the user is not authenticated, the verification server 212 redirects the request (via the network 220) to the authentication server 214 where the user must be authenticated before being presented with the desired information, as more fully described below. In one embodiment, such redirection is facilitated by an HTTP 302 redirect command.

The authentication server 214 is configured to obtain user credentials or login information and utilize this information to authenticate the user. In one embodiment, the authentication server 214 may present a user login screen prompting the user to input his or her credentials or login information. Such credentials may include, but are not limited to, a user name, a password, a location indicator, and/or an IP address. Once the appropriate credentials have been received and the user is authenticated, the authentication server 214 redirects the request (via the network 220) to the central application server 216. In one embodiment, such redirection is facilitated by an HTTP 302 redirect command.

The central application server 216 is configured to determine the location where the information associated with the user is stored. In one embodiment, the central application server 216 includes a location index that includes information pertaining to all authorized users (that is, users capable of being authenticated) and a corresponding location where information associated with each user is stored. In embodiments, the information associated with the authorized users is stored in association with a plurality of partitions associated with one or more information storage servers and the location of the information associated with each user is identified by location information pertaining to a particular partition, e.g., partition 218. Determining the location of the information associated with a user may be accomplished by an internal process comparing information obtained from the user login request to the location index.

Once the location of the information associated with the user has been determined, the central application server 216 redirects the request to the appropriate particular partition, e.g., partition 218, via the network 220. In one embodiment, such redirection is facilitated by an HTTP 302 redirect command. The information associated with the user is then transmitted from the particular partition 218 to the browser running on the computing device 210 (via the network 220). Additionally, a cookie is generated that includes the location information for the partition in association with which the information associated with the user is stored. The cookie is then stored in association with the browser running on the computing device 210. Upon subsequent requests for the information associated with the user received from the same web browser (that is, requests received later in time than the above-described request for information associated with the user), after user authentication, the location information included in the cookie is utilized to direct the request directly to the particular partition (e.g., partition 218) without having to repeat the act of identifying the partition.

If the location of the information associated with the user has changed since the previous login (i.e., since generation of the cookie), the subsequent request is redirected from the particular partition (e.g., partition 218) to a redirect server, for instance, the central application server 216 (via the network 220), where the partition in association with which the information associated with the user is subsequently stored is identified. In this instance, a modified cookie is generated and stored in association with the browser running on the computing device 210, the modified cookie including the location of the subsequently identified partition, and the subsequent request is redirected to the subsequently identified partition.

In embodiments, the cookie generated and stored in association with the browser may be extensible to include not only location information for the partition with which the information associated with the user is stored, but also to include information pertaining to the identity of the user requesting the information, e.g., the user's email address, user name, or the like. In this way, multiple users utilizing the same browser running on a computing device may be appropriately directed to the locations within the plurality of partitions where their respective user information is stored. In such embodiments, the user credentials or login information may be analyzed as compared to any user-information-location containing cookies stored in association with the browser to identify the appropriate cookie (and, thus, the appropriate location of the information associated with a particular user). The identified cookie may then be utilized to direct the particular user to the appropriate user information storage location.

In embodiments, compression techniques (for example, normalization and text compression) may be utilized to minimize the size of the cookie stored in association with the browser. For instance, and by way of example only, a mapping code may be utilized to identify URLs for accessing requested user information and/or 2-byte hashing of email addresses may be utilized for the information pertaining to the identity of the user requesting information. These compression techniques, and many others, are known to those of ordinary skill in the art and, accordingly, are not further described herein.

In embodiments, the cookie generated and stored in association with the browser may be encrypted thus preventing undesirable user modification thereof.

Figure 3:
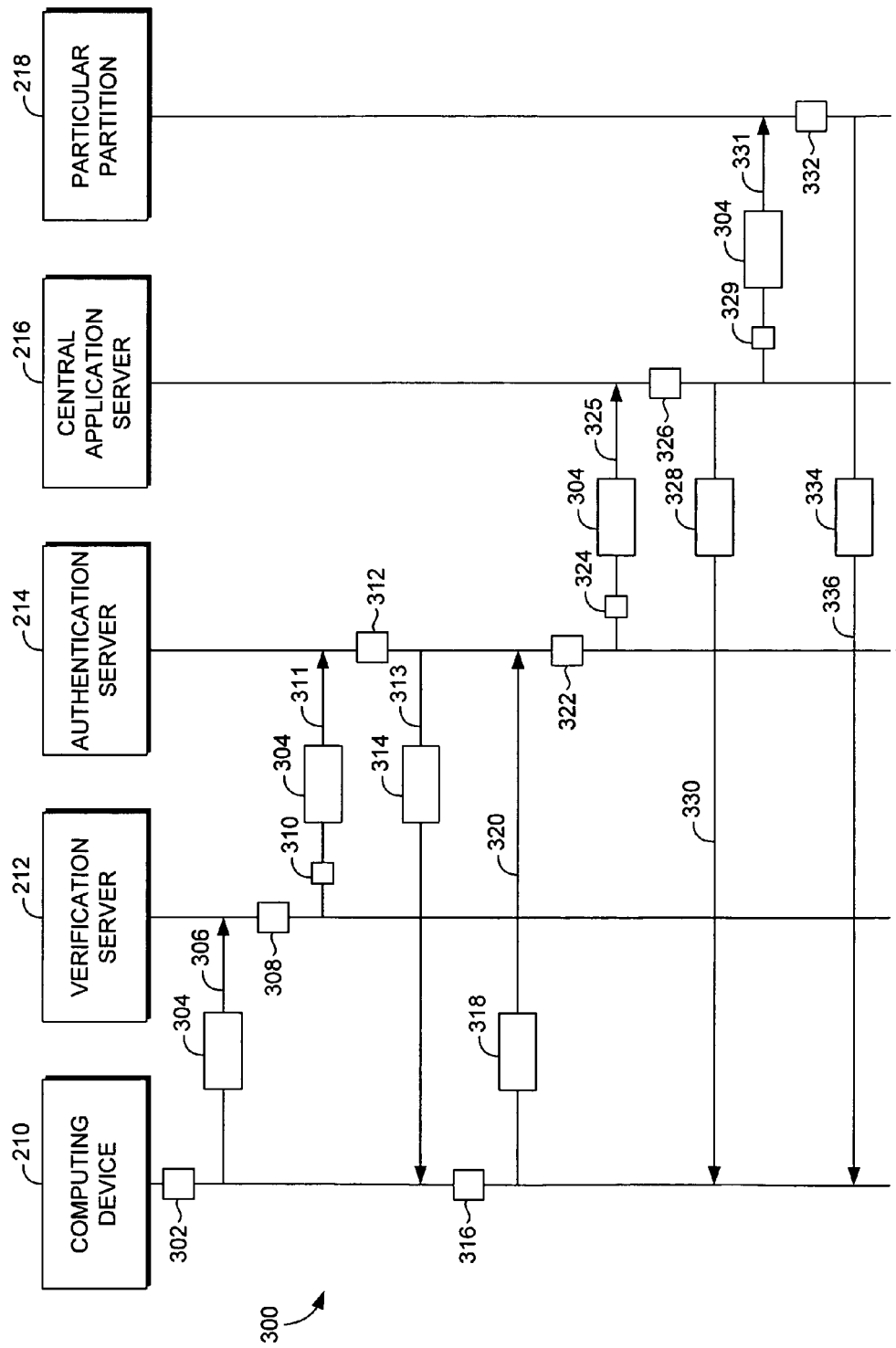
FIG. 3 is a flow diagram showing a method of generating a cookie containing partition location information suitable for use in decreasing login latency, in accordance with an embodiment of the present invention.

FIG. 3 depicts an illustrative method 300 of generating a cookie containing partition location information suitable for use in decreasing login latency, in accordance with an embodiment of the present invention. Initially, as indicated by reference numeral 302, a request 304 for user information is received by a browser running on a computing device 210. The received request 304 is directed, as indicated by reference numeral 306, to a verification server 212. At the verification server 212, it is determined, as indicated by reference numeral 308, that a user associated with the request 304 is not authenticated, and a redirect command 310 is generated. As indicated by reference numeral 311, in accordance with the redirect command 310, the request 304 is directed an authentication server 214. At the authentication server 214, a user login interface 314 is generated, as indicated by reference numeral 312, and directed to the browser running on the computing device 210, as indicated by reference numeral 313. As indicated by reference numeral 316, user credentials or login information 318 is received by the browser running on the computing device 210. The login information 318 is directed, as indicated by reference numeral 320, to the authentication server 214, where the login information is utilized to authenticate the user. As indicated by reference numeral 322, a second redirect command 324 is generated and, in accordance therewith, the request 304 is directed to a central application server 216, as indicated by reference numeral 325. At the central application server 216, the request 304 for user information is analyzed, as indicated by reference numeral 326, to identify the location of the information associated with the user. As set forth above with respect to FIG. 2, in embodiments, the information associated with the authenticated user is stored in association with a plurality of partitions associated with one or more information storage servers and the location of the information associated with the user is identified by location information pertaining to a particular partition. In the illustrated embodiment, it is determined at reference numeral 326 that the information associated with the user is stored in association with particular partition 218.

Still at reference numeral 326, a cookie 328 is generated, the cookie 328 including the identified location of the information associated with the user. The cookie 328 is directed, as indicated by reference numeral 330, to the browser running on the computing device 210 and stored in association therewith. Upon receiving subsequent requests for the user information from the browser, the location information associated with the cookie may be utilized to direct the request directly to the particular partition 218, as more fully described below with respect to FIG. 4.

Still at reference numeral 326, upon identifying the location information pertaining to the particular partition 218 in association with which the information associated with the user is stored, the central application server 216 generates a third redirect command 329. As indicated by reference numeral 331, in accordance with the third redirect command 329, the request 304 is directed to the particular partition 218. As indicated by reference numeral 332, an information response 334 is generated, where the information response 334 comprises the information associated with the user that the user has requested. As indicated by reference numeral 336, the information response 334 is then directed to the browser running on the computing device 210 and presented to the user.

Figure 4:
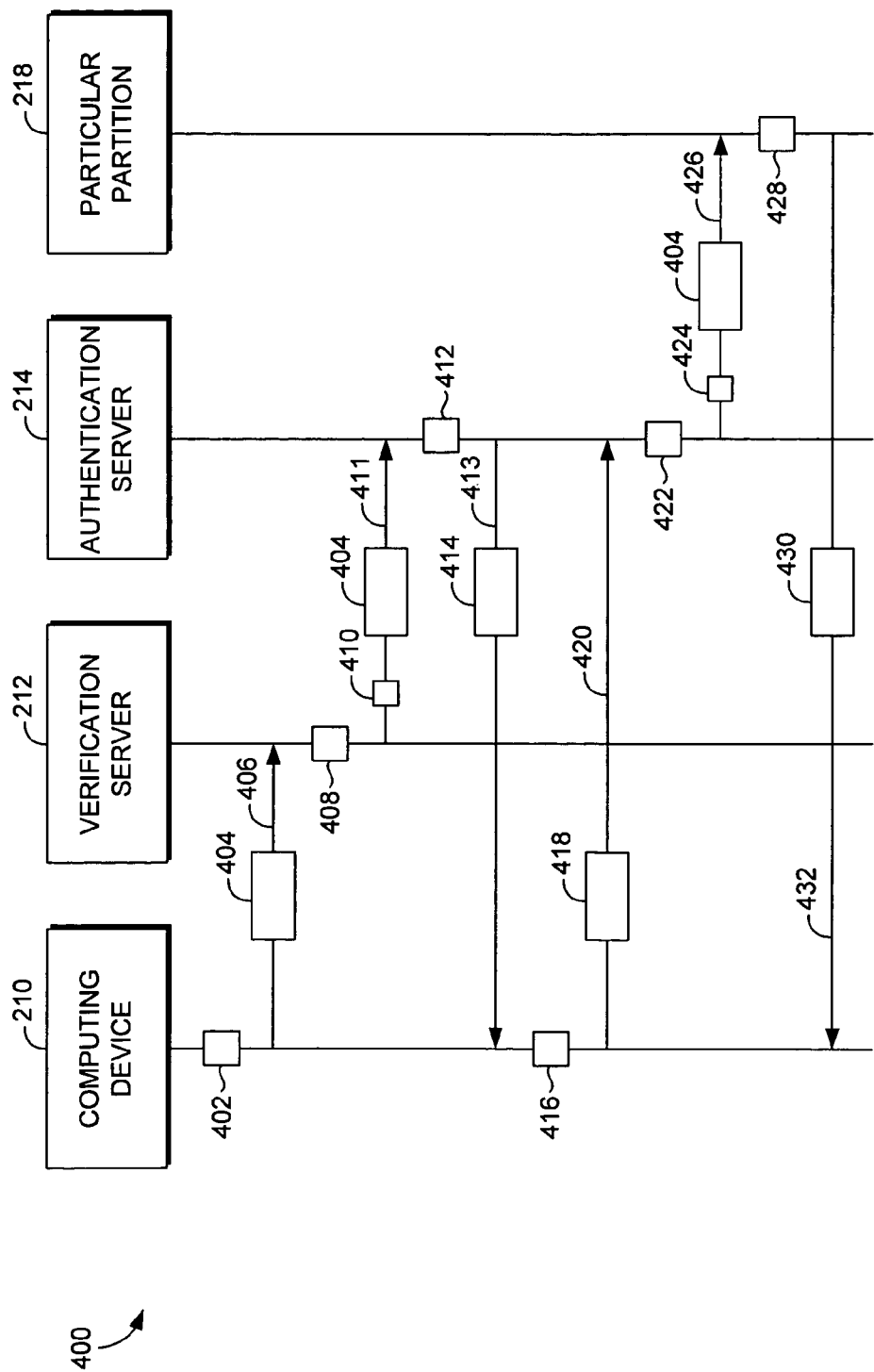
FIG. 4 is a flow diagram showing a method of utilizing partition location information to decrease login latency, in accordance with an embodiment of the present invention.

FIG. 4 depicts an illustrative method 400 of utilizing partition location information to decrease login latency, in accordance with an embodiment of the present invention. Initially, as indicated at reference numeral 402, a request 404 for information associated with a user is received by a browser running on a computing device 210. The browser accesses a cookie stored in association therewith that includes the location of the requested information associated with the user. As set forth above with respect to FIG. 2, in embodiments, the information associated with the user is stored in association with a plurality of partitions associated with one or more information storage servers and the location of the information associated with the user is identified by location information pertaining to a particular partition. In the illustrated embodiment, the cookie stored in association with the browser running on the computing device 210 indicates that the information associated with the user is stored in association with particular partition 218.

As indicated at reference numeral 406, the request 404 for user information is directed to a verification server 414. At the verification server 212, it is determined, as indicated at reference numeral 408, that the user associated with the request 404 is not authenticated, and a redirect command 410 is generated. As indicated by reference numeral 411, in accordance with the redirect command 410, the request 404 is directed to an authentication server 214. At the authentication server 214, a user login interface 414 is generated, as indicated by reference numeral 412, and directed to the browser running on the computing device 210, as indicated by reference numeral 413. As indicated by reference numeral 416, user credentials or login information 418 is received by the browser running on the computing device 210. The login information 418 is directed, as indicated by reference numeral 420, to the authentication server 214, where the login information is utilized to authenticate the user.

As indicated by reference numeral 422, a second redirect command 424 is generated utilizing the partition location information included in the cookie and, in accordance therewith, the request 404 is directed to the particular partition 218, as indicated by reference numeral 426. As indicated at reference numeral 428, it is determined that the requested information associated with the user is still stored in association with the particular partition 218 and an information response 430 is generated, where the information response 430 comprises the information associated with the user that the user has requested. As indicated by reference numeral 432, the information response 430 is then directed to the browser running on the computing device 210 and presented to the user.

Though not illustrated in FIG. 4, if at reference numeral 428 it had been determined that the requested information associated with the user was not still stored in association with the particular partition 218, the request 404 would have been redirected to a central application server, e.g., central application server 216 of FIG. 3. The method then would have continued as explained above with reference to FIG. 3 beginning at reference numeral 326.

Figure 5A:
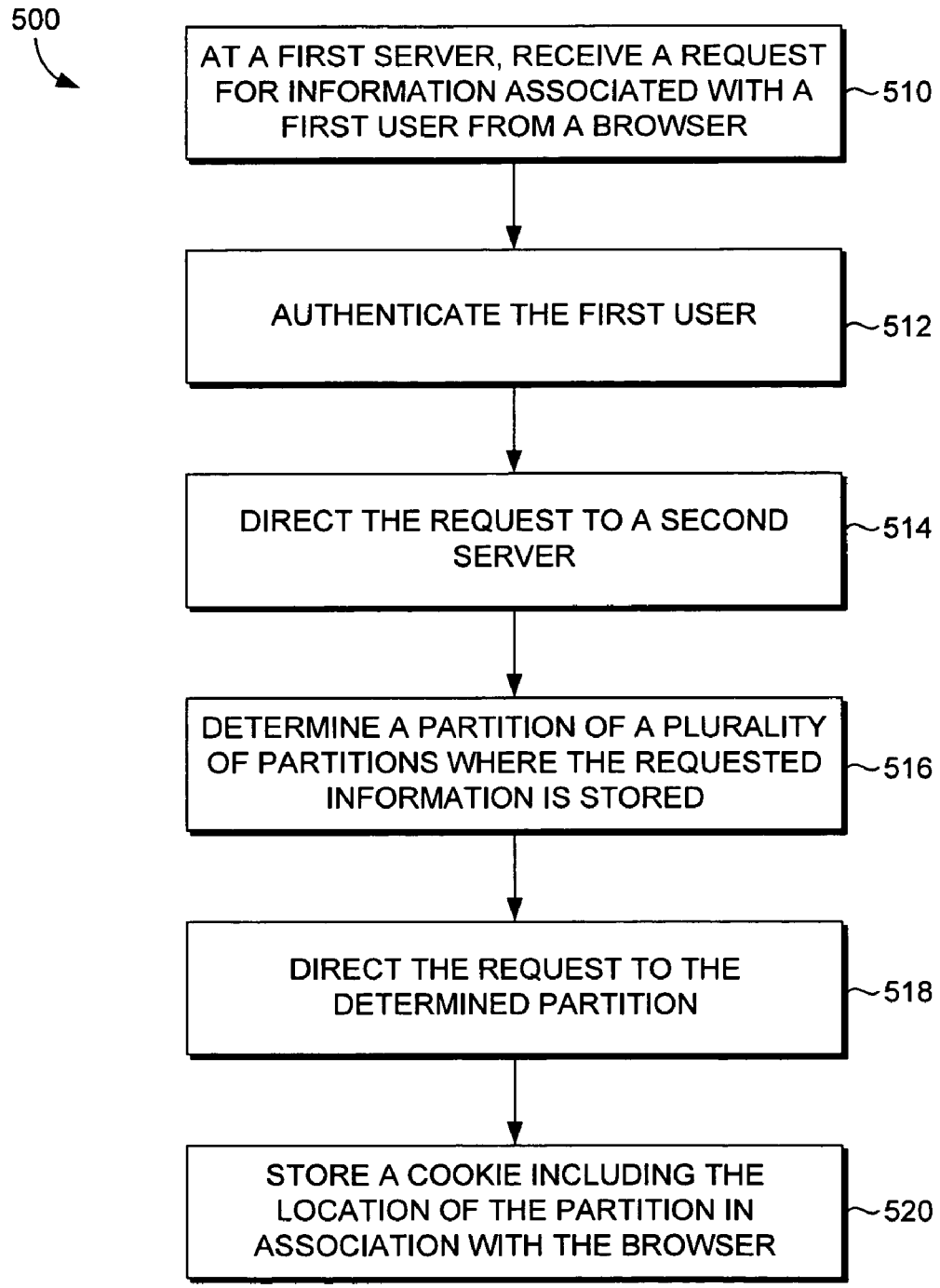
FIG. 5A depicts a flow diagram showing a method for decreasing web service login latency, in accordance with an embodiment of the invention.
Figure 5B:
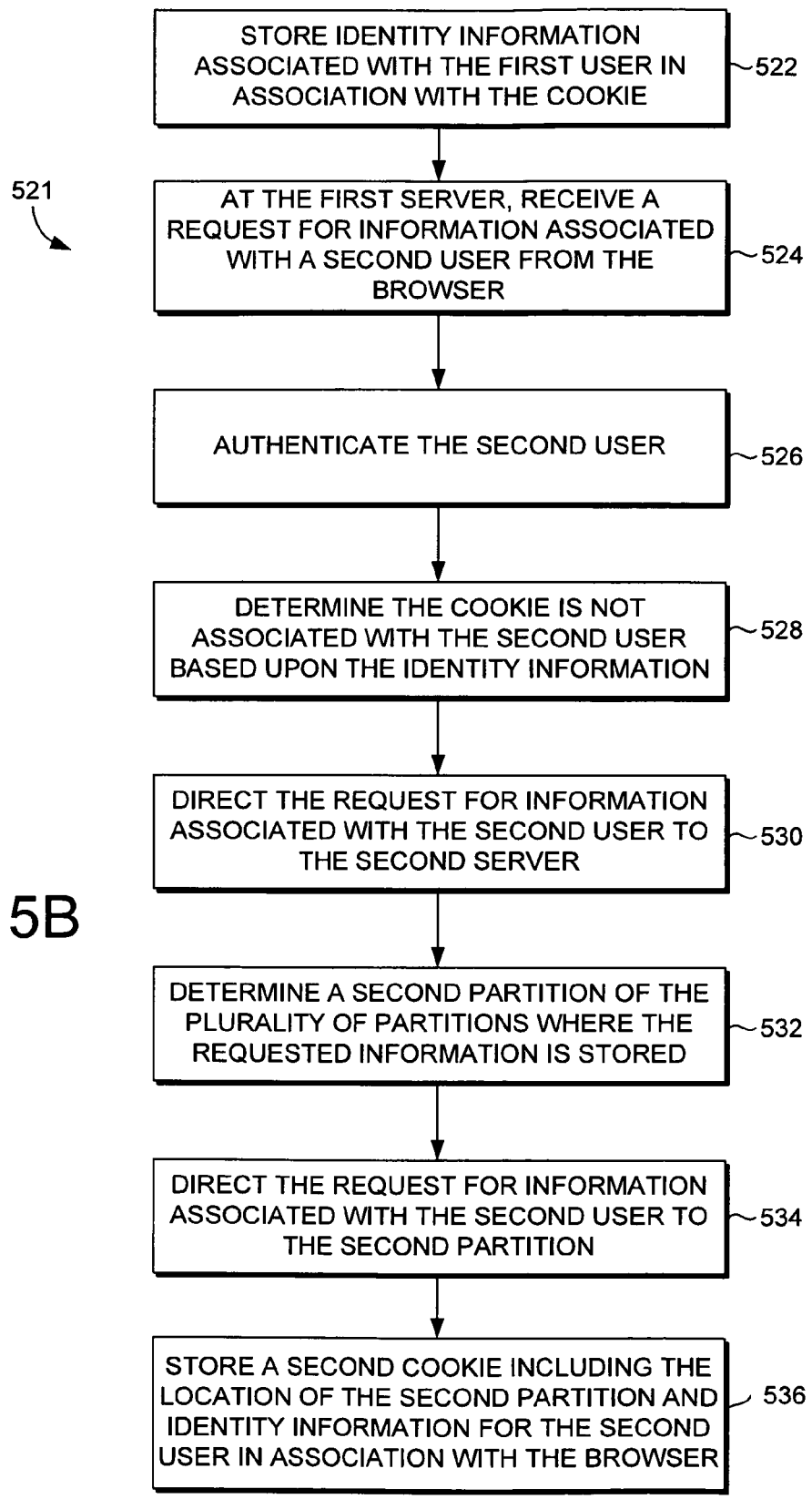
FIG. 5B depicts another flow diagram showing a method for decreasing web service login latency, in accordance with an embodiment of the invention.
Figure 5C:
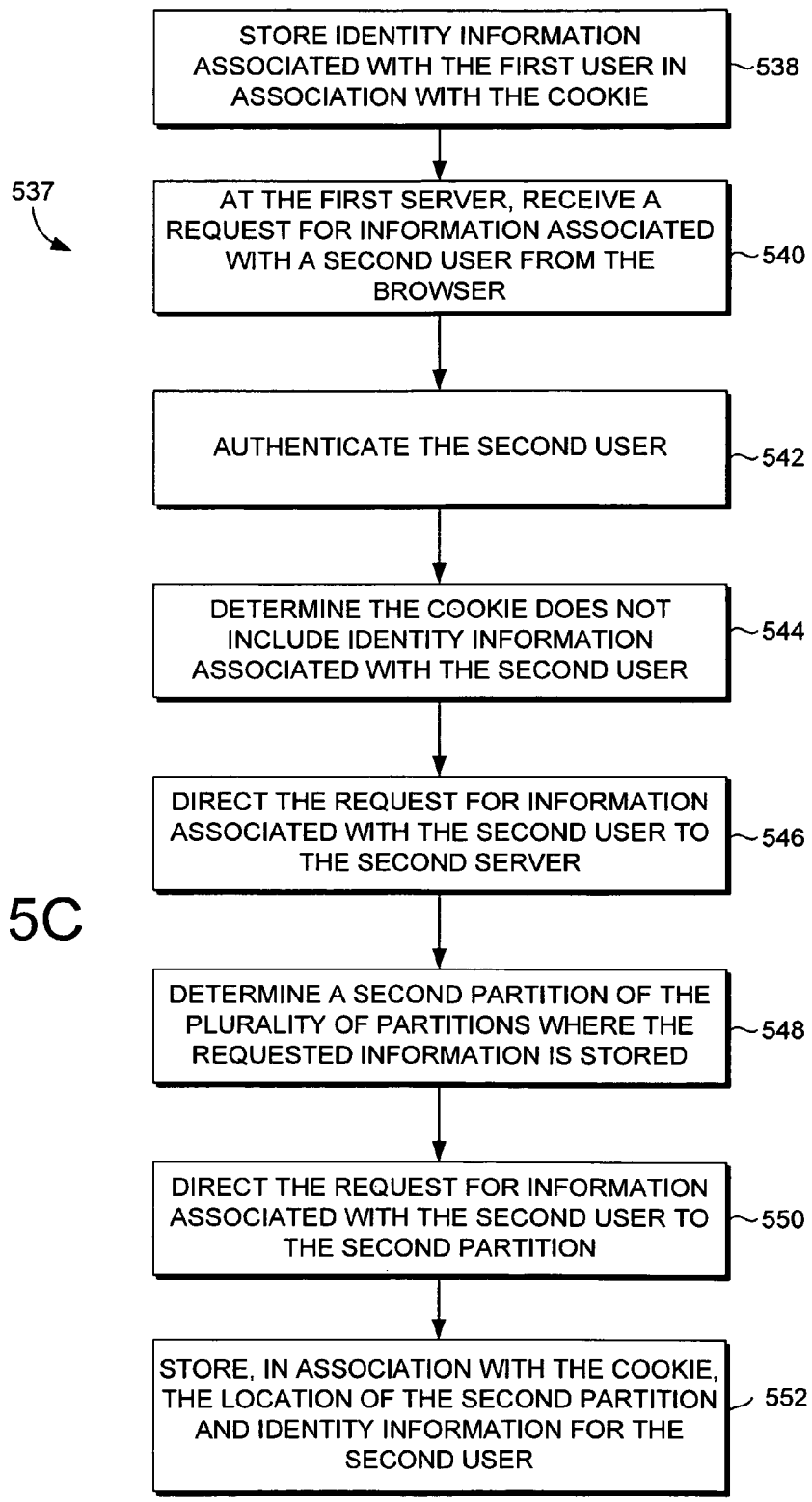
FIG. 5C depicts a further flow diagram showing a method for decreasing web service login latency, in accordance with an embodiment of the invention.

Turning now to FIGS. 5A, 5B and 5C, a flow diagram is illustrated showing a method 500 for decreasing web service login latency, in accordance with an embodiment of the present invention. With initial reference to FIG. 5A, as indicated at block 510, at a first server (e.g., verification server 212 of FIG. 2), a first request for information associated with a first user is received from a browser running on a computing device, e.g., computing device 210 of FIG. 2. As indicated at block 512, the first user is authenticated. The first user may be authenticated at the first server, for instance, if it is determined at the first server that the user is already authenticated (e.g., already logged into the web service). If it is determined, however, at the first server that the user is not authenticated, the user may be authenticated utilizing an authentication server, for instance, authentication server 214 of FIG. 2, upon receipt of appropriate user credentials, as more fully described herein above.

As indicated at block 514, the first request for the information associated with the first user is directed to a second server, for instance, central application server 216 of FIG. 2. It is determined at the second server, in association with which first particular partition (e.g., particular partition 218 of FIG. 2) of a plurality of partitions associated with a third server (e.g., an information server as described above with reference to FIG. 2) the requested information associated with the first user is stored. This is indicated at block 516. As indicated at block 518, the first request for the information associated with the first user is directed to the first particular partition (e.g., particular partition 218 of FIG. 2). As indicated at block 520, a first cookie is generated and stored in association with the browser, the first cookie including location information for the first particular partition.

In embodiments, the first cookie may be extensible and additionally include identity information associated with the user associated with the information request. In embodiments, identify information may comprise identifying information particular to a user, such as a user name. Identity information may also comprise an IP address, or other computer-specific or location-based information. In this way, multiple users may utilize the same browser associated with a computing device and still be properly directed to the particular partition where their respective information in stored. Two such embodiments are illustrated in FIGS. 5B and 5C.

FIG. 5B depicts a flow diagram showing a method 521 for decreasing web service login latency, in accordance with another embodiment of the invention. As indicated at block 522, in addition to location information for the first particular partition, the first cookie includes identity information associated with the first user. When a subsequent request for information associated with a second user is received at the first server from the browser, as indicated at block 524, the subsequent request includes the first cookie. As indicated at block 526, the second user is authenticated. Then, as indicated at block 528, it is determined, based upon the identity information associated with the first user included therewith, that the first cookie is not associated with the second user. As such, instead of being directed directly to the first particular partition identified by the location information stored in association with the first cookie, the request for information associated with the second user is redirected to the second server, as indicated at block 530. Depending upon whether the user is authenticated at the first server (verification server) or an authentication server, both embodiments having been described herein above, the identity information and location information included in the first cookie may be interpreted by either the first server or the authentication server, or a combination thereof, within embodiments of the present invention, to determine whether the first cookie is associated with the second user.

It is then determined at the second server in association with which second particular partition of the plurality of partitions associated with the third server the requested information associated with the second user is stored. This is indicated at block 532. The request for information associated with the second user is then redirected to the second particular partition, as indicated at block 534. Subsequently, as indicated at block 536, a second cookie is generated and stored in association with the browser, the second cookie including location information for the second particular partition and identity information associated with the second user.

Alternatively, identity information associated with multiple user may be stored in association with a single cookie. FIG. 5C depicts a flow diagram showing a method 537 for decreasing web service login latency, in accordance with a further embodiment of the invention. As indicated at block 538, in addition to location information for the first particular partition, the cookie includes identity information associated with the first user. When a subsequent request for information associated with a second user is received at the first server from the browser, as indicated at block 540, the subsequent request includes the cookie. As indicated at block 542, the second user is authenticated. Then, as indicated at block 544, it is determined that the cookie does not include identity information associated with the second user. As such, instead of being directed directly to the first particular partition identified by the location information stored in association with the cookie, the request for information associated with the second user is redirected to the second server, as indicated at block 546. Depending upon whether the second user is authenticated at the first server (verification server) or an authentication server, both embodiments having been described herein above, the identity information and location information included in the cookie may be interpreted by either the first server or the authentication server, or a combination thereof, within embodiments of the present invention, to determine that the cookie does not include identity information associated with the second user.

It is then determined at the second server in association with which second particular partition of the plurality of partitions associated with the third server the requested information associated with the second user is stored. This is indicated at block 548. The request for information associated with the second user is then redirected to the second particular partition, as indicated at block 550. Subsequently, as indicated at block 552, the cookie is modified to include information for the second particular partition and identity information associated with the second user. In embodiments, the cookie is stored in association with the browser.

Figure 6:
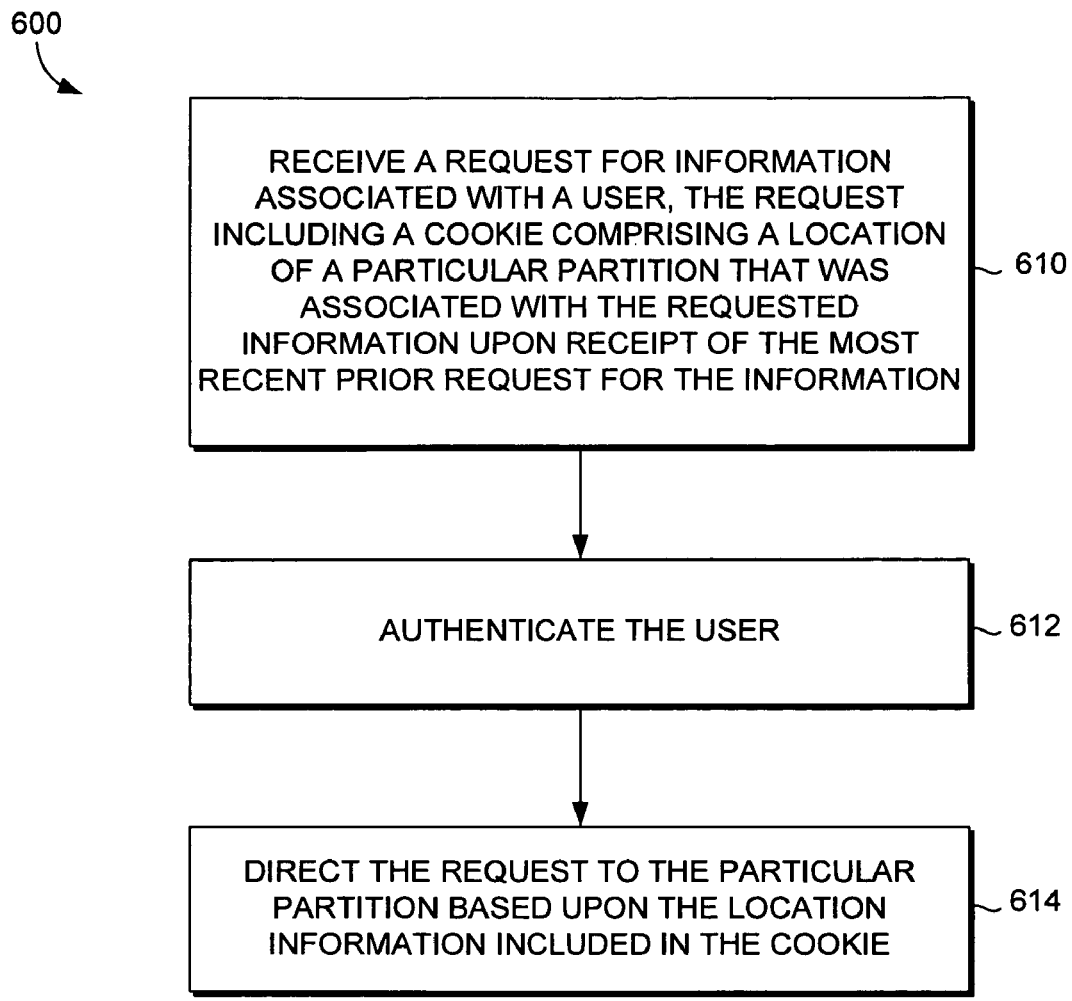
FIG. 6 is a flow diagram showing a method for decreasing web service login latency, in accordance with an embodiment of the invention.

Turning now to FIG. 6, a flow diagram is illustrated showing a method 600 for decreasing web service login latency, in accordance with an embodiment of the present invention. As indicated at block 610, a request for information associated with a first user is received from a browser running on a computing device, e.g., computing device 210 of FIG. 2. The request includes a cookie comprising location information for a particular partition of a plurality of partitions that was associated with the requested information upon recent of the most recent prior request for information from the browser. As indicated at block 612, the user is authenticated. The user may be authenticated at a verification server, for instance, if it is determined at the verification server that the user is already authenticated (e.g., already logged into the web service). If it is determined, however, at the verification server that the user is not authenticated, the user may be authenticated utilizing an authentication server, for instance, authentication server 214 of FIG. 2, upon receipt of appropriate user credentials, as more fully described herein above.

As indicated at block 614, the request for the information is directed to the particular partition (e.g., particular partition 218 of FIG. 2) based upon the location information included in the cookie.

Figure 7:
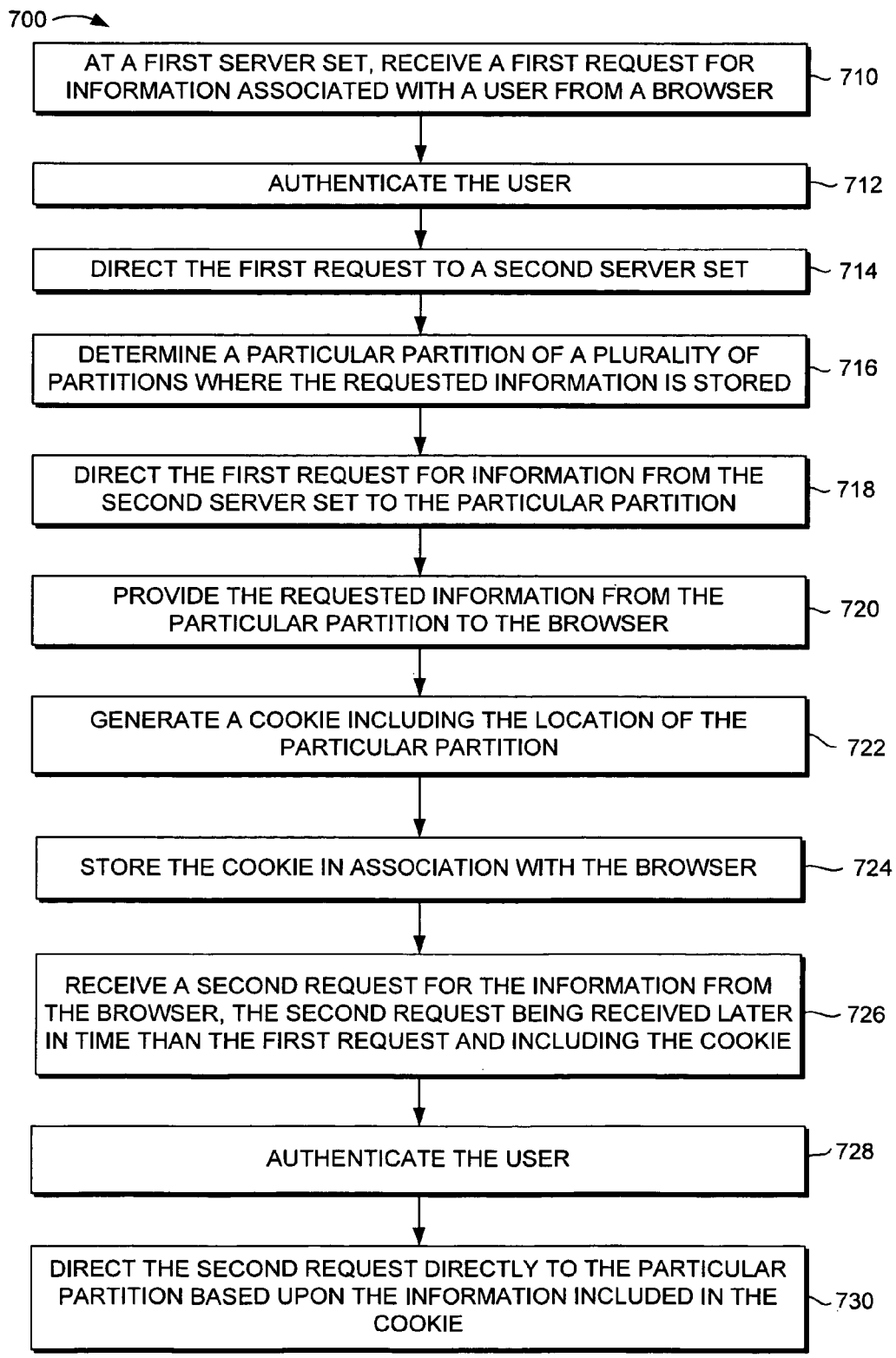
FIG. 7 is a flow diagram showing a method for decreasing web service login latency, in accordance with an embodiment of the invention.

Turning now to FIG. 7, a flow diagram is illustrated showing a method 700 for decreasing web service login latency, in accordance with an embodiment of the present invention. As indicated at block 710, at a first server set, a first request for information associated with a user is received from a browser running on a computing device, e.g., computing device 210 of FIG. 2. As indicated at block 712, the user is authenticated. The user may be authenticated at the first server set, for instance, if it is determined at the first server set that the user is already authenticated (e.g., already logged into the web service). If it is determined, however, at the first server set that the user is not authenticated, the user may be authenticated utilizing an authentication server, for instance, authentication server 214 of FIG. 2, upon receipt of appropriate user credentials, as more fully described herein above.

As indicated at block 714, the first request for the information associated with the first user is directed to a second server set. It is determined at the second server, in association with which particular partition (e.g., particular partition 218 of FIG. 2) of a plurality of partitions in a third server set (e.g., an information server as described above with reference to FIG. 2) the requested information associated with the user is stored. This is indicated at block 716. As indicated at block 718, the first request for the information associated with the user is directed to the particular partition (e.g., particular partition 218 of FIG. 2). As indicated at block 720, the requested information associated with the first user is provided to the browser running on the computing device.

As indicated at block 722, a cookie is generated that includes location information for the particular partition in association with which the information associated with the user is stored. The cookie is then stored in association with the browser running on the computing device, as indicated at block 724.

At a point later in time than the first request for the information, a second request for the information associated with the user is received from the browser, as indicated at block 726. The request includes the cookie generated at block 722. The user is again authenticated, as indicated at block 728, and the second request for the information is directed directly to the particular partition based upon the location information included in the cookie. This is indicated at block 730.

As can be seen, embodiments of the present invention provide systems, methods, and computer-storage media for decreasing web service login latency. Upon a user's initial login to the web service from a web browser, the location of user information (e.g., partition) associated with a server where information associated with the user is stored, is identified. A cookie containing location information identifying the partition is generated and stored in association with the web browser. Upon a subsequent login to the web service by the same user, the partition location information included in the cookie is utilized to direct the user request directly to the correct partition, without having to repeat the act of identifying the partition, thus providing the user with the desired information more quickly.

Many different arrangements of the various components depicted, as well as components not shown, are possible without departing from the spirit and scope of the present invention. Embodiments of the present invention have been described with the intent to be illustrative rather than restrictive. Alternative embodiments will become apparent to those skilled in the art that do not depart from its scope. A skilled artisan may develop alternative means of implementing the aforementioned improvements without departing from the scope of the present invention.

It will be understood that certain features and sub-combinations are of utility and may be employed without reference to other features and sub-combinations and are contemplated within the scope of the claims. Not all steps listed in the various figures need be carried out in the specific order described.

The invention claimed is:

1. Computer storage having computer-useable instructions embodied thereon that, when executed, perform a method for decreasing login latency, the method comprising:
   at a first server, receiving from a browser running on a computing device a first request for information associated with a first user; authenticating the first user; directing the first request for the information associated with the first user to a second server;
   determining at the second server in association with which first particular partition of a plurality of partitions stores the requested information associated with the first user, wherein the plurality of partitions is associated with a third server;
   directing the first request for the information associated with the first user to the first particular partition;
   storing a cookie in association with the browser, wherein the cookie includes including location information for the first particular partition and identity information associated with the first user;
   at the first server, receiving from the browser a first request for information associated with a second user, the first request for information associated with the second user including the cookie;
   authenticating the second user;
   determining that the cookie does not include identity information associated with the second user;
   directing the first request for information associated with the second user to the second server;
   determining at the second server which second particular partition of the plurality of partitions stores the requested information associated with the second user;
   directing the first request for the information associated with the second user to the second particular partition;
   storing, in association with the cookie, location information for the second particular partition and identity information associated with the second user;

at the first server, receiving from the browser a second request for the information associated with the first user, the second request for the information associated with the first user being received later in time than the first request for the information associated with the first user and including the cookie;

authenticating the first user;

directing the second request for the information associated with the first user directly to the first particular partition based upon the location information included in the cookie; and determining whether the information associated with the first user requested in each of the first and second requests for information is still stored in association with the first particular partition, wherein upon determining that the information associated with the first user requested in each of the first and second requests for the information is still stored in association with the first particular partition, the method further comprises providing the requested information associated with the first user from the first particular partition to the browser.

2. The computer storage of claim 1, wherein authenticating the first user comprises determining, at the first server, that the first user is authenticated, and wherein directing the first request for the information associated with the first user to the second server comprises directing the first request for the information associated with the first user from the first server to the second server.

3. The computer storage of claim 1, wherein authenticating the first user comprises:

determining, at the first server, that the first user is not authenticated;

directing the first request for the information associated with the first user to an authentication server; and authenticating the first user at the authentication server based upon login information associated with the first user.

4. The computer storage of claim 3, wherein directing the first request for the information associated with the first user to the second server comprises directing the first request for the information associated with the first user from the authentication server to the second server.

5. The computer storage of claim 1, further comprising interpreting the location information included in the cookie at the first server.

6. The computer storage of claim 1, wherein authenticating the first user comprises authenticating the first user at an authentication server based upon login information associated with the first user, and wherein the method further comprises interpreting the location information included in the cookie at the authentication server.

7. The computer storage of claim 5, wherein upon determining that the information associated with the first user requested in each of the first and second requests for the information is not still stored in association with the first particular partition, the method further comprises:

directing the second request for the information associated with the first user from the first particular partition to the second server;

determining at the second server in association with which second particular partition of the plurality of partitions associated with the third server the requested information associated with the first user is stored;

directing the second request for the information associated with the first user to the second particular partition; and storing a modified cookie in association with the browser, the modified cookie including location information for the second particular partition.

8. The computer storage of claim 1, wherein the method further comprises:

at the first server, receiving from the browser a second request for the information associated with the second user, the second request for the information associated with the second user being received later in time than the first request for the information associated with the second user and including the cookie;

authenticating the second user; and directing the second request for the information associated with the second user directly to the second particular partition based upon the location information associated with the second user included in the cookie.

9. Computer storage having computer-useable instructions embodied thereon that, when executed, perform a method for decreasing login latency, the method comprising:

receiving from a browser running on a computing device a request for information associated with a first user, the request including a cookie comprising location information for a first particular partition of a plurality of partitions that was associated with the requested information upon receipt of the most recent prior request for the information from the browser, wherein the plurality of partitions is associated with a third server;

authenticating the user;

directing the request for the information to the first particular partition based on the location information included in the cookie;

determining whether the requested information is still stored in association with the first particular partition, wherein, upon determining that the requested information is still stored in association with the first particular partition, the method further comprises providing the requested information from the first particular partition to the browser;

at the first server, receiving from the browser a first request for information associated with a second user, the first request for information associated with the second user including the cookie;

authenticating the second user;

determining that the cookie does not include identity information associated with the second user;

directing the first request for information associated with the second user to a second server;

determining at the second server which second particular partition of the plurality of partitions stores the requested information associated with the second user;

directing the first request for the information associated with the second user to the second particular partition; and storing, in association with the cookie, location information for the second particular partition and identity information associated with the second user;

at the first server, receiving from the browser a second request for the information associated with the first user, the second request for the information associated with the first user being received later in time than the first request for the information associated with the first user and including the cookie;

authenticating the first user;

directing the second request for the information associated with the first user directly to the first particular partition based upon the location information included in the cookie; and determining whether the information associated with the first user requested in each of the first and second requests for information is still stored in association with the first particular partition, wherein upon determining that the information associated with the first user requested in each of the first and second requests for the information is still stored in association with the first particular partition, the method further comprises providing the requested information associated with the first user from the first particular partition to the browser.

10. The computer storage of claim 9, wherein authenticating the user comprises determining at a first server that the user is authenticated, and wherein directing the request for the information to the particular partition comprises directing the request for the information from the first server directly to the particular partition.

11. The computer storage of claim 10, further comprising interpreting the location information included in the cookie at the first server.

12. The computer storage of claim 9, wherein authenticating the user comprises:

determining at a first server that the user is not authenticated;

directing the request for the information to an authentication server; and authenticating the user at the authentication server based upon login information associated with the user.

13. The computer storage of claim 11, wherein directing the request for the information to the particular partition comprises directing the request for the information from the authentication server to the particular partition.

14. The computer storage of claim 11, wherein authenticating the first user comprises interpreting the location information included in the first cookie at the authentication server.

15. The computer storage of claim 13, wherein upon determining that the requested information is not still stored in association with the particular partition, the method further comprises:

directing the request for the information to a redirect server;

determining at the redirect server in association with which different particular partition of the plurality of partitions the requested information is stored;

directing the request for the information from the redirect server to the different particular partition; and storing a modified cookie in association with the browser, the modified cookie including location information for the different particular partition.

16. A computerized method for decreasing login latency, the method comprising:

at a first server set, receiving from a browser running on a computing device a first request for information associated with a user;

authenticating the user;

directing the first request for information associated with the user to a second server set;

determining at the second server set which particular partition of a plurality of partitions stores the requested information associated with the user, wherein the plurality of partitions is in a third server set;

directing the first request for information associated with the user from the second server set to the particular partition;

providing the requested information from the particular partition to the browser;

generating a cookie, the cookie including location information for the particular partition;

storing the cookie in association with the browser;

receiving from the browser a second request for the information associated with the user, the second request for the information being received later in time than the first request for the information and including the cookie;

authenticating the user;

directing the second request directly to the particular partition based upon the location information included in the cookie;

at the first server set, receiving from the browser a first request for information associated with a second user, the first request for information associated with the second user including the cookie;

authenticating the second user;

determining that the cookie does not include identity information associated with the second user;

directing the first request for information associated with the second user to the second server set;

determining at the second server set which second particular partition of the plurality of partitions stores the requested information associated with the second user;

directing the first request for the information associated with the second user to the second particular partition: and storing, in association with the cookie, location information for the second particular partition and identity information associated with the second user.

17. The computerized method of claim 16, further comprising:

verifying that the requested information is still stored in association with the particular partition to which the second request for information was directed; and providing the requested information from the particular partition to the browser.

* * * * *